Oct. 1, 1963   W. J. HAYES   3,105,453
SHIP CONTROL SYSTEM
Filed Nov. 24, 1961   3 Sheets-Sheet 1

INVENTOR
W. J. HAYES
BY Theodore E. Bieber
HIS ATTORNEY

Oct. 1, 1963  W. J. HAYES  3,105,453
SHIP CONTROL SYSTEM
Filed Nov. 24, 1961  3 Sheets-Sheet 3

INVENTOR
W.J. HAYES
BY Theodore E. Bieber
HIS ATTORNEY 3,105,453
SHIP CONTROL SYSTEM
William J. Hayes, Torrance, Calif., assignor to Shell Oil Company, New York, N.Y., a corporation of Delaware
Filed Nov. 24, 1961, Ser. No. 154,723
6 Claims. (Cl. 114—144)

This invention pertains to a method of ship control and more particularly to a method for positioning a mother ship with relation to a submarine vehicle or operator.

In many marine operations it is necessary to have a submarine vehicle or robot operator operating below the surface of a body of water or moving along the floor of a body of water to perform various operations. These submarine vehicles are free-moving vehicles that are controlled and operated from a mother ship floating on the surface. While the submarine vehicles are controlled from the surface, it is desirable that they be moved without regard to the position of the mother ship. The mother ship is then positioned with relation to the submarine vehicle in order to maintain the proper relationship between the mother ship and the submarine vehicle.

In the past it has been the practice to manually control the mother ship to follow the movements of the submarine vehicle. This method requires skilled personnel to observe the movements of the submarine vehicle and operate the controls of the mother ship so that it can follow these movements. Even with the use of skilled personnel it is very difficult to follow a freely moving submarine vehicle. This results in curtailment of the submarine vehicle's movements in order to permit the operating personnel to properly position the mother ship.

Accordingly, it is the principal object of this invention to provide a novel method of control to permit the mother ship to accurately follow the movements of a submarine vehicle.

A further object of this invention is to provide a novel method for positioning a mother ship to follow the course of a submarine vessel within certain preset limits.

A still further object of this invention is to provide a unique automatic control system for a mother ship to permit it to follow the movements of a submarine vessel wherein the angular deflection of a control line between the mother ship and the submarine vessel is determined, the angular deflection then being used to control the movements of the mother ship.

The above objects and advantages of this invention are achieved by providing a control line between the submarine vehicle and the mother ship. The angular deflection of this control line is then measured in two fixed planes that are oriented with the longitudinal and athwartships axes of the mother ship. These angular deflections are then compared with preset values in order to obtain error signals. The preset values are adjusted to provide the required freedom of movement of the submarine vehicle within a limited radius of the mother ship. The error signals are then vectorially combined and used to operate the thrust producing devices of the mother ship.

The above objects and advantages will be more easily understood from the following detailed description of a preferred embodiment when taken in conjunction with the attached drawings, in which.

Figure 1:
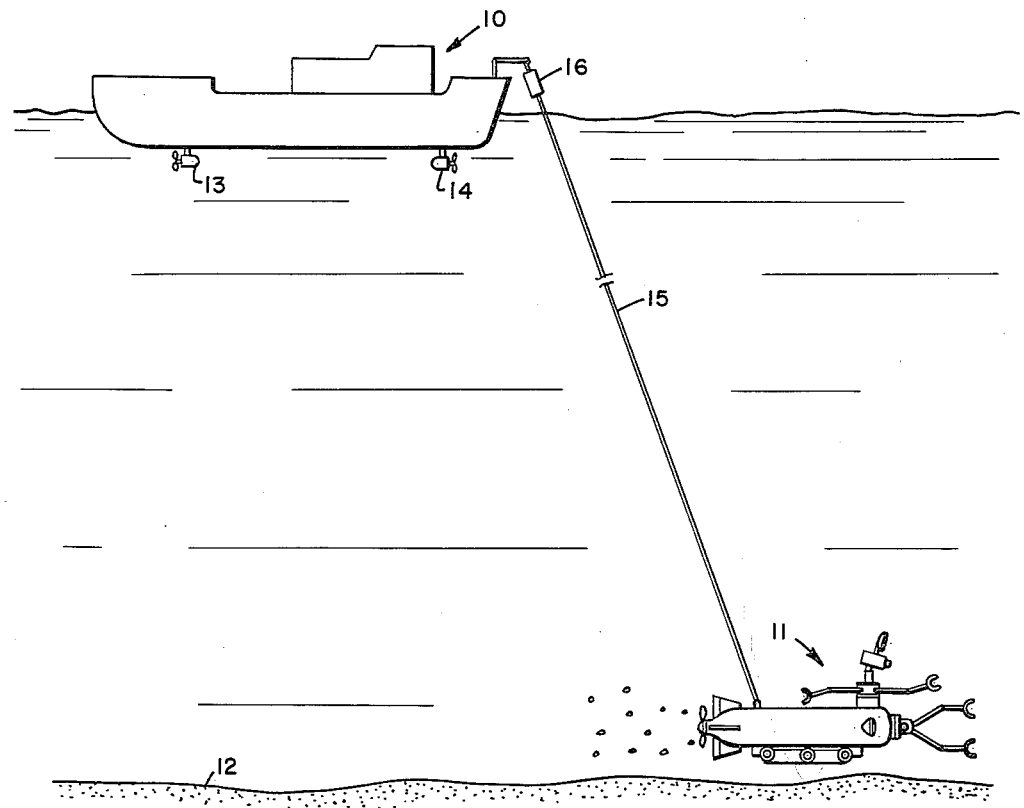
FIGURE 1 is a schematic view of one apparatus for performing the method of this invention.

Referring now to FIGURE 1, there is shown a schematic drawing of a mother ship 10 which controls and services a submarine vehicle or robot 11. While the vehicle 11 is shown as a robot it obviously could take other forms such as a submarine or other device having freedom of movement and operation. The submarine vehicle is designed to move along the bottom 12 of a body of water to perform a specified task or operation. For example, it may be used to observe a pipe line which is layed along the ocean floor for an offshore petroleum installation. The mother ship 10 is provided with propulsion devices 13 and 14. These propulsion devices are preferably of the type that have a means for varying their thrust and the direction of thrust through 360 degrees. Large outboard motor type propulsion means are one example of these types of devices. These propulsion means are preferably mounted in motor wells formed in the bow and stern of the mother ship 10 but may be mounted in other locations. The only requirement for the propulsion means are that there be at least two separate propulsion means that are spaced from each other and from the center of rotation of the mother ship 10. The submarine vehicle is coupled or tethered to the mother ship by means of a control line 15. The control line 15 includes suitable circuits for controlling the movements of a submarine vehicle in addition to supplying the physical strength to tether the submarine vehicle to the mother ship. An angular displacement measuring device or tiltmeter 16 is disposed on the mother ship to measure the angular deflection of the control line 15 in two planes which are essentially at right angles to each other. These two planes are preferably aligned with the longitudinal and athwartships axes of the mother ship 10 although they can be disposed in other orientations. A suitable deflection measuring device is shown and described in a copending application of Kenneth W. Foster, entitled "Position Locating Device," Serial No. 830,604, filed July 30, 1959. While a suitable mounting means for the deflection device is described in copending patent application of Howard L. Shatto, Jr. et al., entitled "Ship Control Apparatus," Serial No. 143,319, filed October 6, 1961.

As submarine vehicle 11 moves along the bottom 12, the angular deflection of the control line 15 will change in the vertical planes that are oriented with the longitudinal and athwartships axes of the mother ship 10. These changes in the deflection will be detected by the tiltmeter 16 and supplied to a suitable ship control unit described below with relation to FIGURE 2. The ship control unit utilizes the measured deflections and compares them with preset values to determine error signals. These error signals will then be vectorially resolved to provide two vectors indicating the magnitude of the thrust and the direction of thrust required of each of the propulsion units 13 and 14. The two vectors will indicate the direction and magnitude of the thrust required from each of the propulsion units 13 and 14 to move the mother ship to the correct position. In the correct position the deflection of the control line 15 will be within the preset limits. Thus, it is possible to maneuver the submarine vehicle 11 as desired without regard to the position of the mother ship 10. This freedom of movement will increase the usefulness of the submarine vehicle and result in much easier operation thereof. Of course, the angular position of the control line can be maintained at any desired angle depending on the adjustment of the ship control system as explained below.

Figure 2:
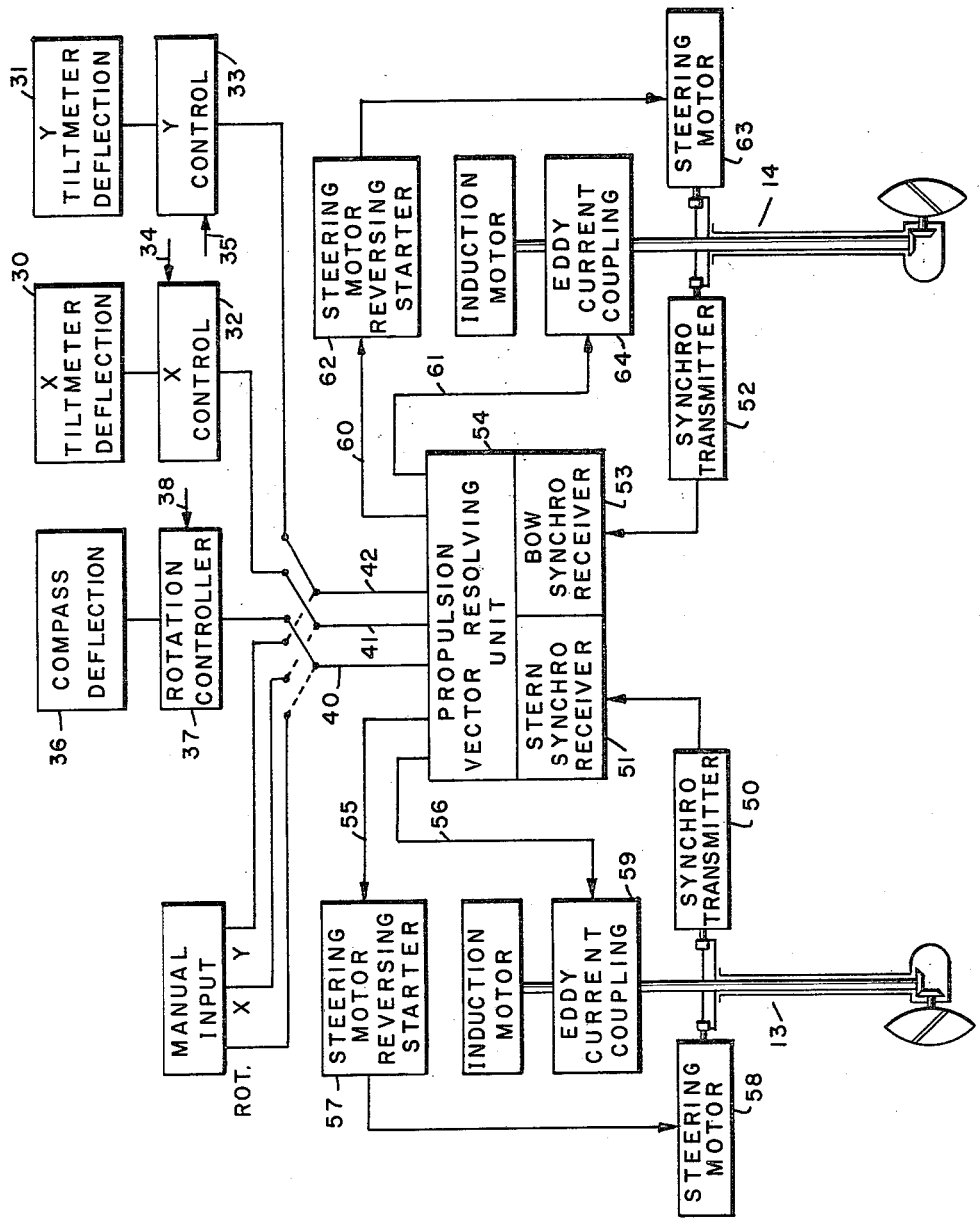
FIGURE 2 is a block diagram of a ship control unit for controlling the mother ship while performing the method of this invention.

Referring to FIGURE 2, there is shown a block diagram of one embodiment of a ship control system for use with this invention. Two propulsion units 13 and 14 are disposed at the bow and stern of the floating vessel, respectively. The disposition of the propulsion units is shown in FIGURE 1 in which the units are illustrated as being disposed in wells formed in the bow and stern of the mother ship 10, respectively. The propulsion units are provided with a thrust generating means such as propellers driven by a variable speed drive means, for example an electric motor of the induction type coupled to the propellers through eddy current couplings 59 and 64. Similarly, the propulsion units may be rotated about their vertical axes in order to vary the direction of the thrust.

From the above description it can be appreciated that the propulsion units are very similar to outboard motors except for the fact that they are driven by an electrical means and their propellers may be rotated through 360 degrees. Several types of propulsion units fulfilling these requirements are available.

The propulsion units are provided with synchro-transmitters 50 and 52 which provide a signal indicating the direction of thrust of the propulsion unit relative to the vessel. The synchro-transmitters 50 and 52 are coupled to synchro-receivers 51 and 53, respectively. The synchro-receivers 51 and 53 form a part of the vector resolving unit 54 which receives information from various sources and provides signals for controlling the stern and bow propulsion units. The vector resolving unit 54 will be described in greater detail below.

The vector resolving unit 54 provides four signals which are schematically illustrated by the lines 55, 56, 60 and 61. The lines 56 and 61 represent control signals suitable for controlling the thrust of the propulsion units. These lines are shown as being connected to eddy current couplings 59 and 64 of the propulsion units 13 and 14, respectively. The lines 55 and 61 represent signals which are used to control the direction of the thrust of the two propulsion units 13 and 14, respectively. The signals represented by the lines 55 and 60 are supplied to the steering motor reversing starters 57 and 62 which in turn start, stop and reverse the steering motors 58 and 63, respectively.

The vector resolving unit 54 receives signals representing the desired thrust to be supplied along the longitudinal and athwartship axes of the mother ship 10 as well as the rotational thrust required of the propulsion units. The desired thrust along the longitudinal and athwartship axes is determined by controllers 32 and 33. Each of these controllers receives a separate signal from the tiltmeter potentiometers 30 and 31 which measure deflections in the vertical planes disposed at right angles, as explained above. The controllers 32 and 33 can be commercial controllers that have, in addition to set point adjustments 34 and 35, conventional control response adjustments such as proportional, reset and derivative actions. The rotational controller 37 receives a signal from gyrocompass 36 and is similar to controllers 32 and 33 in its actions. The controllers 32, 33 and 37 supply signals illustrated by the lines 40, 41 and 42 which are vectorially combined in the vector resolving unit 54.

From the above discussion it can be appreciated that means have been provided by which two propulsion units located in the bow and stern of the mother ship may be positioned in order to maintain the mother ship in its desired position with relation to the submarine vessel 11. The propulsion units are provided with a variable thrust means as well as a means for varying the direction of the thrust in order that the vessel may be maintained in its desired location or moved over a course to follow the submarine vessel. The vector resolving unit 54 provides signals for controlling both the magnitude of the thrust supplied by each of the propulsion units as well as the direction of the thrust. In order to provide the required control signals the vector resolving unit receives signals indicating the direction in which each of the propulsion units must be directed and the thrust required of each unit to move the vessel back to its desired location. The rotational controller insures that the mother ship will maintain a predetermined heading that may be changed by changing the set point 38 of rotational controller 37. Thus, the mother ship may be adjusted to move in essentially the same direction as the submarine vessel 11.

From the above description of the ship control unit of FIGURE 2, it can be readily appreciated that it will position the mother ship 10 so that it will follow the movements 11 of the submarine vehicle. The set point of the controllers 32 and 33 can be adjusted to maintain any desired angular relationship of the control line passing from the mother ship to the submarine vehicle. The angular deflection of this line is sensed by the tiltmeter that determines the angular deflection of the line in two planes which are preferably aligned with the longitudinal and athwartship axes of the mother ship. The propulsion control system shown in FIGURE 2 and described above is more fully described and claimed in a copending application of H. L. Shatto, Jr., and R. J. Dozier, Serial No. 95,601, filed March 14, 1961, entitled "Ship Control System."

Figure 3:
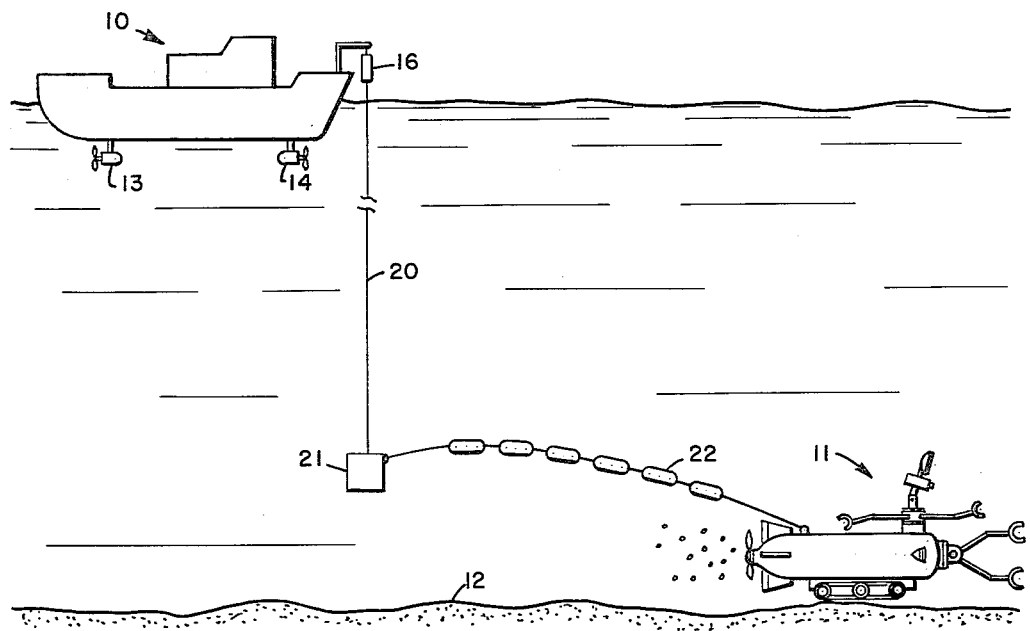
FIGURE 3 is a schematic drawing showing the modification of the apparatus of FIGURE 1; and, FIGURE 4 is a third schematic drawing showing a further modification of the apparatus of FIGURE 1.

Referring now to FIGURE 3, there is shown a modification of the system shown in FIGURE 1. This modification consists of suspending the control line 20 in a vertical position. In order to maintain the control line 20 in a near vertical position a weight 21 is attached to the lower end thereof. The submarine vehicle 11 is coupled to the control line through a buoyant control line extension 22. Thus, the submarine vehicle will have a radius of operation depending on the length of the buoyant extension 22 without moving the control line. This modification has the advantage over that shown in FIGURE 1 in that it permits the submarine vehicle to operate within a certain defined area without requiring any movement on the part of the mother ship. Thus, the movements of the mother ship are decreased while the submarine vehicle has complete freedom to operate.

In the modification shown in FIGURE 3, the ship control unit should be adjusted as explained with reference to FIGURE 2 to maintain the control line 20 substantially vertical. The control line 20 will be displaced from the vertical by movements of the mother ship and the ship control system as explained above will reposition the mother ship to return it to a vertical position.

Figure 4:
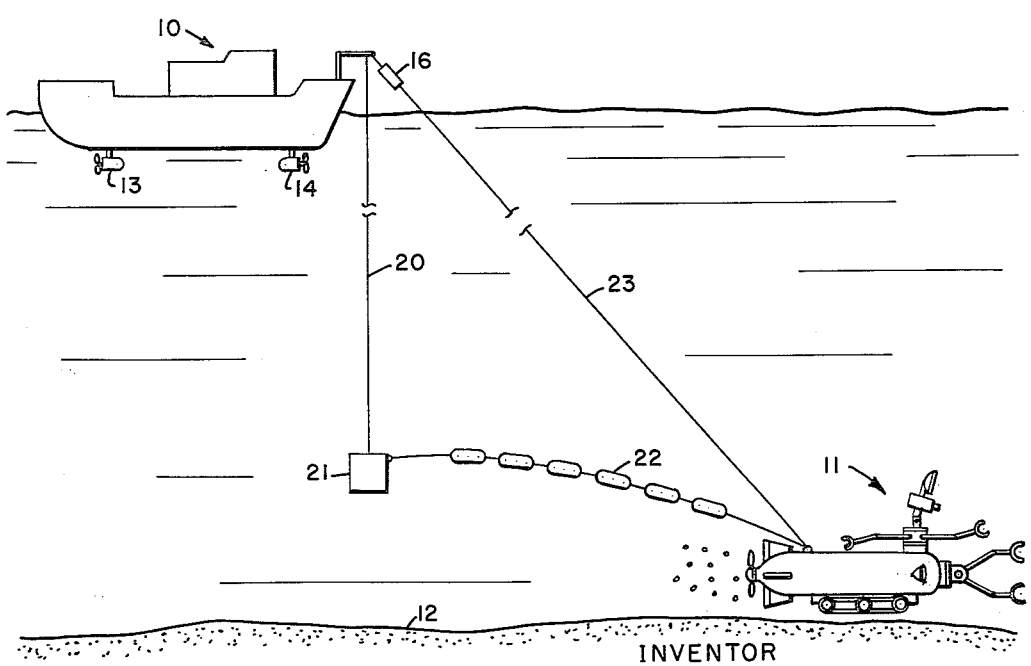

Referring now to FIGURE 4, there is shown a further modification of the ship control system which combines the features of the system shown in FIGURES 1 and 3. In FIGURE 4, the control line is still in a vertical position and the submarine vehicle attached thereto by means of buoyant cable 22. In addition, a small diameter line 23 is attached to both the submarine vehicle and the mother ship. The tiltmeter 16 is disposed to sense the angular deflection of the line 23 in two planes that are oriented with respect to the longitudinal and athwartship axes of the mother ship. The ship control unit is then adjusted to maintain predetermined angular deflections with the line 23 as explained above with relation to FIGURES 1 and 2.

I claim as my invention:

1. A method of positioning a mother ship to cause it to follow the movements of a submarine vessel, said method comprising: detecting the angular deflection of a taut line between the mother ship and the submarine vessel in two vertical planes at an angle to each other; comparing said detected deflections with preset values; detecting the heading of said mother ship and comparing said heading with a preset heading, vectorially resolving the differences between said detected deflections and heading and said preset deflections and heading to obtain a vector indicating the required direction and magnitude of thrust to move the mother ship to cause it to follow the movements of the submarine vessel while maintaining a desired heading.

2. A method of positioning a mother ship to cause it to follow the movements of a freely moving submarine vessel, wherein said mother ship is provided with at least two propulsion means disposed thereon in spaced relationship, each of said propulsion units having means for varying the thrust and direction thereof, said method comprising: detecting the angular deflection of a taut line between the mother ship and submarine vessel in two vertical planes at substantially right angles; comparing said detected deflections with preset values; detecting the heading of the mother ship and comparing said heading with a preset heading; determining the direction of thrust of each propulsion unit; vectorially resolving the differences between the detected deflections and headings and the preset deflections and heading with the direction of thrust for each propulsion unit to obtain the required direction and magnitude of thrust for each propulsion unit to maintain the difference between the detected deflections and detected heading and preset values thereof substantially zero.

3. A method of positioning a mother ship to cause it to follow the movements of a submarine vessel that is controlled from the mother ship, said mother ship having at least two propulsion units disposed thereon in a spaced relationship, each of said propulsion units having a means for varying the magnitude of thrust and the direction of thrust, said method comprising: positioning a guide line between said mother ship and said submarine vessel; detecting the angular deflection of the guide line in two vertical planes aligned with the longitudinal and athwartships axes of the mother ship; comparing the measured angular deflections with preset values of the angular deflections to determine deflection error signals; detecting the heading of the mother ship and comparing it with a preset value to determine a heading error signal, detecting the direction of thrust of each propulsion unit; vectorially combining the deflection and heading error signals and detected direction of thrust of each propulsion unit to obtain the required direction and magnitude of thrust for each propulsion unit to maintain the error signals substantially zero.

4. The method of claim 1 in which the preset values of the deflections and heading are chosen to permit the submarine vessel to have a limited degree of movement free of corresponding movement of the mother ship.

5. The method of claim 1 in which the preset values of the deflections and heading are chosen to permit the submarine vessel to have a limited degree of movement free of corresponding movement of the mother ship.

6. The method of claim 1 in which one tethers the submarine vessel to the mother ship by a separate line from said taut line.

References Cited in the file of this patent
UNITED STATES PATENTS

| | | |
|---|---|---|
| 1,777,209 | Laverack | Sept. 30, 1930 |
| 2,650,046 | Vanderlip | Aug. 25, 1953 |
| 2,873,075 | Mooers et al. | Feb. 10, 1959 |